Figure 1:
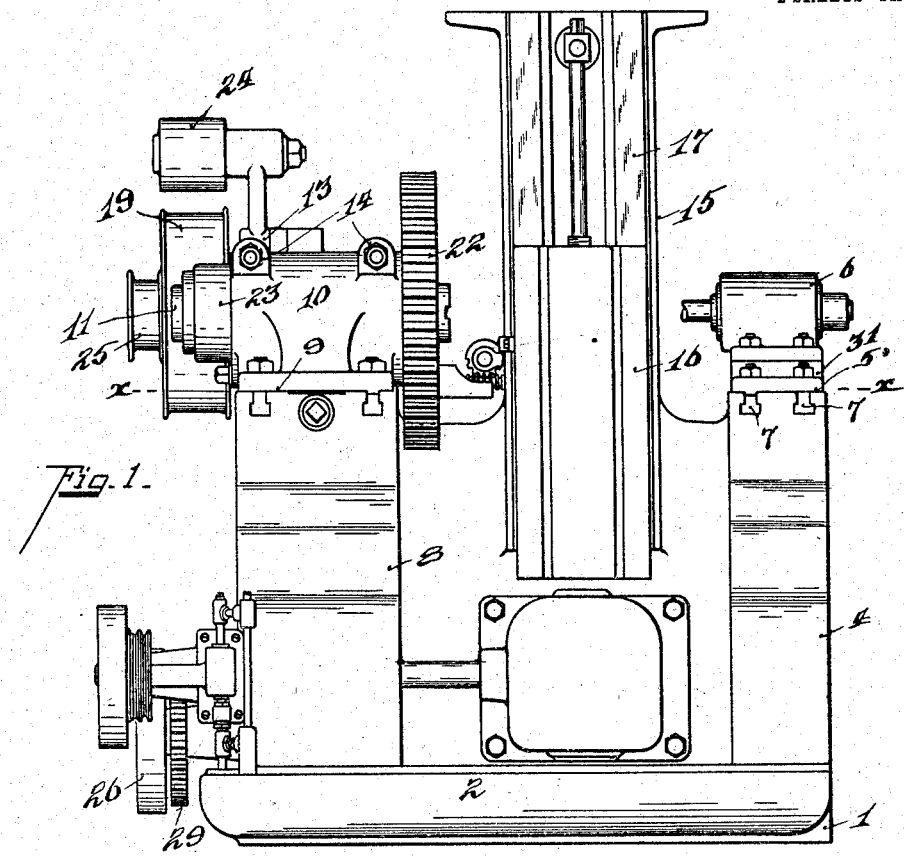

A. L. DE LEEUW.
MILLING MACHINE.
APPLICATION FILED SEPT. 11, 1908.

927,776.

Patented July 13, 1909.
2 SHEETS—SHEET 1.

Witnesses
Olive B. Kaiser
Arthur Faulhaber

Inventor
Adolph L. De Leeuw
By Word & Word
Attorneys

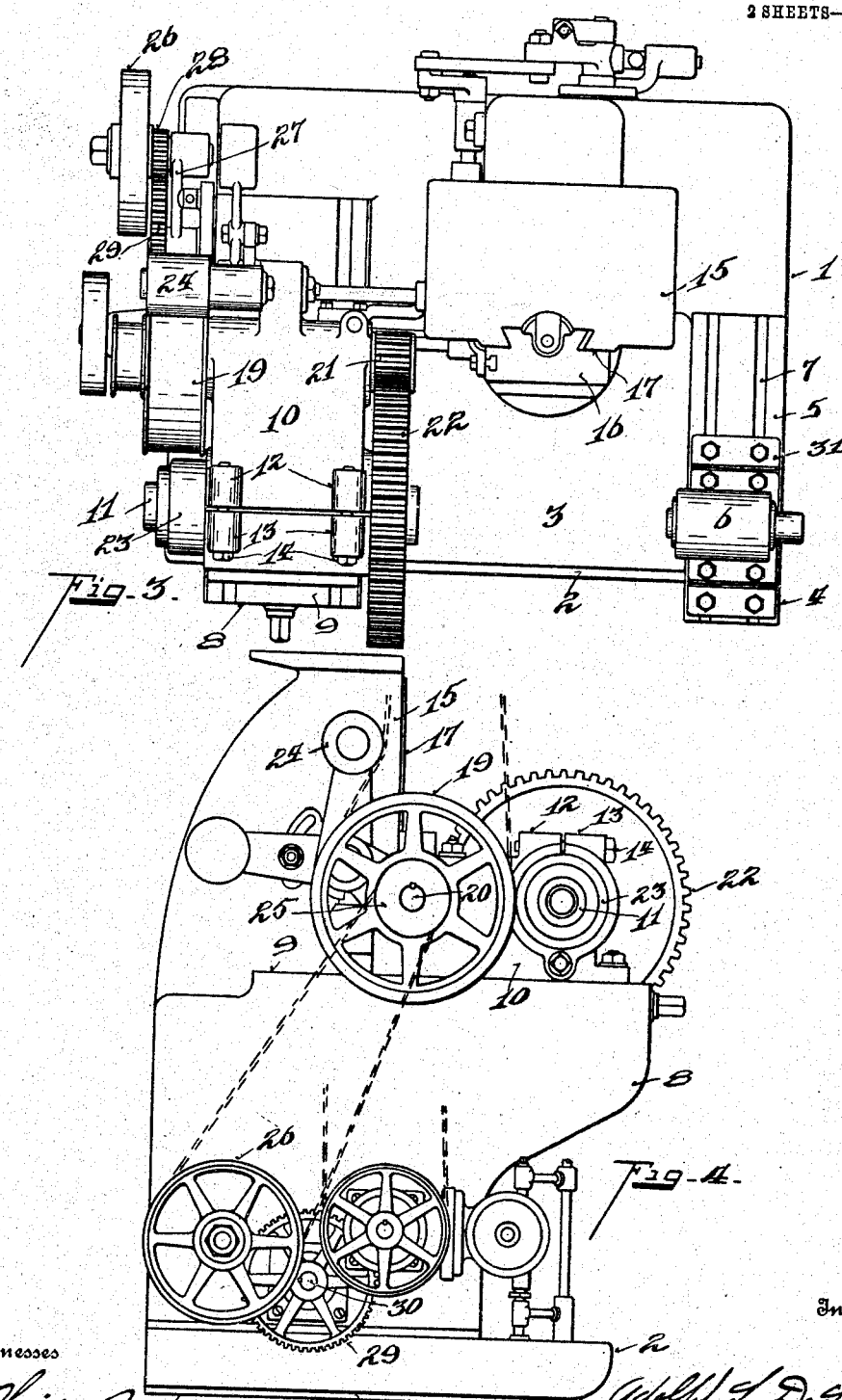

UNITED STATES PATENT OFFICE.

ADOLPH L. DE LEEUW, OF HAMILTON, OHIO, ASSIGNOR TO THE CINCINNATI MILLING MACHINE COMPANY, OF CINCINNATI, OHIO, A CORPORATION.

MILLING-MACHINE.

No. 927,776.            Specification of Letters Patent.            Patented July 13, 1909.

Application filed September 11, 1908. Serial No. 452,683.

*To all whom it may concern:*

Be it known that I, ADOLPH L. DE LEEUW, a citizen of the United States, residing at Hamilton, in the county of Butler and State of Ohio, have invented certain new and useful Improvements in Milling - Machines, of which the following is a specification.

My invention relates to milling machines.

The object of the invention is to produce a special tool of this general character, particularly designed and adapted for the quick performance of a given piece of work.

A tool of this character is in requisition in shops in which a great number of similar jobs is called for, and hence the machine need have no provision for quick adjustments for a wide range of work, or the various other refinements essential in the standard milling machine. Being thus able to eliminate so much of the complex and conventional milling machine mechanism, I am able to concentrate my efforts in the direction of securing superior simplicity, and compact and powerful structural elements having convenient provision for rapidly changing the work from one job to another, as well as provision for very rapidly and efficiently performing each particular job.

It is, therefore, my chief design to organize the feed elements so that a more compact and rigid structure may be employed for the operating parts and the power directly applied to the work in the machine organization.

Other features of my invention relate to a simple and convenient arbor adjustment in relation to the drive. Also, to certain improvements in the feed and various other structural improvements which will be more particularly pointed out subsequently.

To this end my invention primarily aims to produce one solid bed to which the table is directly gibbed in a vertical plane, so as to make a vertical stroke with reference to the cutter. This arrangement not only permits the cuttings to fall clear of the table movements, but it renders it unnecessary to provide the vertical adjustment of the spindle, and it also avoids any joints and holds the work constantly and rigidly in the vertical plane of the table movement. Further, this arrangement involves very little floor space comparatively and enables me to use an oil pan to the best advantage. My organization also enables me to employ a table feed and a quick return drive independently driven from the spindle and the main countershaft respectively.

I also provide means for longitudinally adjusting the spindle in a compact and rigid bearing closely disposed to the bed, the transmission from the driving shaft of the machine preferably being longitudinally adjustable with the spindle.

I also preferably employ belt types of drive for the main pulley of the driving shaft and from the spindle to the feed shaft and throw in and out the power automatically by actuating belt tension mechanism. The spindle is also horizontally adjustable on the bed, the belt type of drive with the adjustable belt tension mechanism permitting of this adjustment without any inconvenience.

The details of the belt drive for the main driving shaft with its provision for accommodating the horizontal adjustment of the head-stock, and the means for automatically tripping the belt tension are not made subject-matter of this specification.

The various features of my invention are more fully set forth in the description of the accompanying drawings, forming a part of this invention, in which:—

Figure 2:
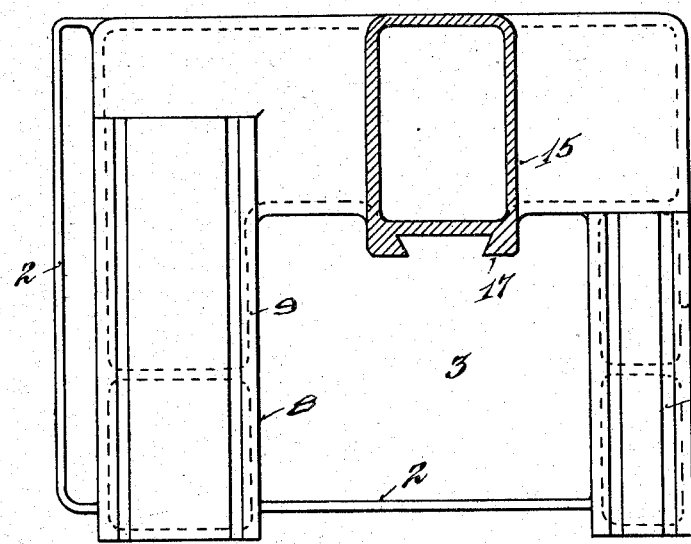

Figure 1 is a front elevation of my milling machine. Fig. 2 is a section on line *x, x,* Fig. 1 of the frame. Fig. 3 is a top plan view of the machine. Fig. 4 is a side elevation of the same.

1 represents the base of the machine frame, which is provided with a marginal flange 2, extended upon two sides thereof forming a trough 3, within the base, to receive the oil drippings and cuttings.

4 represents a vertical column formed integral with the base 1, with its upper face 5 having a plane surface upon which the tail-stock 6 is adjustably mounted and secured by means of bolts carried by the tail-stock and entered into the ways 7. The tail-stock is constructed to receive the cutter arbor in the usual manner.

8 represents a vertical column formed integral with the base 1, provided with a plane surface 9, upon its upper face to receive the head-stock 10. The head-stock is clamped and adjusted in the same manner as the tail-stock. The head-stock 10 is provided with a bore to receive the spindle sleeve 23. Said head-stock is split and provided with the ears 12, 13, for frictionally clamping the sleeve 23 in position by means of the bolts 14.

15 represents a vertical column formed integral with the base 1 in a position rearward and between the head and tail-stock columns 8 and 4.

16 represents a carriage or work supporting table gibbed to the front face 17 of the column 15. The carriage is provided with means for vertically feeding the same by hand or power.

The spindle is driven as follows:—19 represents a pulley fixed upon the shaft 20, said shaft being journaled in the head-stock 10 and receiving motion by means of a belt, (shown in dotted lines, Fig. 4), in connection with a suitable countershaft above, not shown. 21 represents a gear splined to shaft 20 in mesh with a gear 22 fixed to the spindle 11; said spindle in this instance is preferably journaled in a sleeve 23. The sleeve, spindle, gears 21 and 22 moving together in a horizontal adjustment of the spindle to and from the tail-stock. 24 represents a belt tightener for the belt driving pulley 19. 25 represents a pulley fixed on shaft 20 carrying a belt to transmit motion to pulley 26 journaled upon a swinging quadrant 27 and carrying a gear 28 in mesh with a gear 29 fixed to a shaft 30 for driving the table or carriage feeding means. By mounting pulley 26 and gear 28 upon a quadrant the belt can be tightened to suit conditions and relatively to the adjustment of the head-stock.

While it is obvious that various means may be employed for driving and adjusting the spindle relative to the tail-stock other than that shown, as well as the power drive for feeding the table, the form shown is preferable in providing a simple and powerful drive, but the essential features of this invention being in adjustably mounting the head-stock, tail-stock and table upon a compact and rigid structure in which the head-stock and tail-stock lie in a horizontal plane and the carriage in a vertical plane. The tail-stock 6 is preferably formed of two sections, the upper portion carrying the arbor being secured to a base plate 31, said base plate being secured to the column, which construction enables the removal of the upper portion of the tail-stock for inserting and removing the cutter, arbor and the like, without displacing the adjusted alinement with the head-stock.

Having described my invention, I claim:—

In a machine of the class described comprising a horizontal bed, a head and tail-stock horizontally adjustable upon the bed, spindles in said head and tail-stock, a portion of the bed being vertically extended between the spindles and formed with a vertical gib-way, a table engaging the gib-way, and a feed mechanism in said vertical bed structure for operating said table.

In testimony whereof, I have hereunto set my hand.

ADOLPH L. DE LEEUW.

Witnesses:
OLIVER B. KAISER,
LUISE BECK.